A. MOORE.
Faucet.
No. 216,627. Patented June 17, 1879.
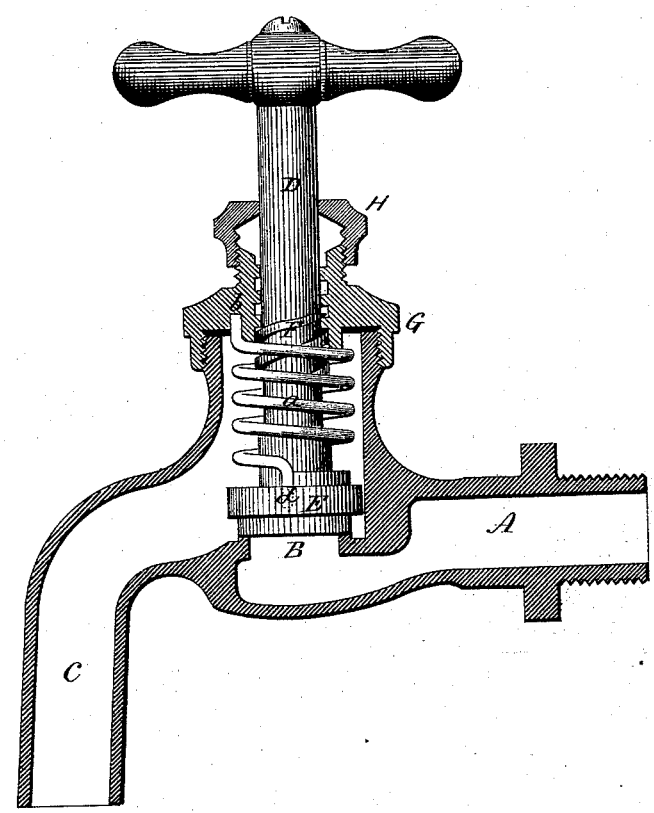

UNITED STATES PATENT OFFICE.

AQUILA MOORE, OF NEW HAVEN, CONNECTICUT, ASSIGNOR TO PECK BROTHERS & CO., OF SAME PLACE.

IMPROVEMENT IN FAUCETS.

Specification forming part of Letters Patent No. 216,627, dated June 17, 1879; application filed May 5, 1879.

*To all whom it may concern:*

Be it known that I, AQUILA MOORE, of New Haven, in the county of New Haven and State of Connecticut, have invented a new Improvement in Faucets; and I do hereby declare the following, when taken in connection with the accompanying drawing and the letters of reference marked thereon, to be a full, clear, and exact description of the same, and which said drawing constitutes part of this specification, and represents a longitudinal section.

This invention relates to an improvement in that class of faucets which are constructed to be self-closing against the pressure of the water, but applicable to other faucets in which the valve is opened by means of a screw-threaded spindle, whether with or against the pressure.

In the usual construction the spindle is made with a quick screw-thread, so that spring or other force applied directly in the axial line of the spindle will force the spindle to revolve and close the valve; but such quick thread requires a considerable expenditure of power to open it; and it necessarily opens and closes with but a partial rotation of the spindle, making it difficult to gradually open the valve, or open it to a small extent when occasion requires.

The object of the invention is to dispense with the direct pressure of the spring upon the valve, and apply it so as to force a rotation of the valve and spindle regardless of the screw-thread; and the invention consists in the construction, as hereinafter described, and particularly recited in the claim.

The shell of the faucet is of the usual construction, A being the inlet; B, the valve-opening; C, the discharge. D is the spindle, provided with any suitable handle for conveniently turning it, and to its lower end the valve E is rigidly attached, so as to turn with the spindle.

The spindle is screw-threaded, as at F, in the usual manner, the nut G being correspondingly threaded, and the usual stuffing-box H applied.

$a$ is the spring, which surrounds the spindle within the chamber above the valve. This is a coil-spring, one end, $b$, of which is made fast in the nut G, or some stationary part of the shell, and the other end, $d$, turned into or made fast to the valve E, and so that by unscrewing the spindle it will raise the valve according to the screw-thread of the spindle, and at the same time will correspondingly wind the spring, and so that when free the reaction of the spring will cause the spindle and valve to revolve in the opposite direction, running the spindle down by means of the screw until the valve is closed, it being understood that the spring is secured under a sufficient strain in its normal condition to produce this result.

By this construction a slow thread may be made on the spindle sufficient in itself to withstand the pressure of the water; hence the spring need only have sufficient power to impart the revolution to the spindle and valve.

It will be understood that if arranged so as to close with the pressure, the relative position of the parts will be reversed—that is, so far as the valve and the seat are concerned—and in that case the spring would be best arranged on the opposite side of the valve.

Where it is preferable to make the valve a stationary part of the spindle, and so as to revolve with it, it will be readily seen that the valve may be swiveled to the spindle and the valve end of the spring attached to the spindle instead of the valve.

I claim—

In a faucet having an inlet, valve-seat, and discharge, the combination of a valve and screw-threaded spindle with a coiled spring, one end of which is attached to the valve or spindle, and the other end to a stationary part of the faucet, and so that the rotation of the spindle in opening the valve will wind the spring, and the reaction of the wound spring close the valve, substantially as described.

AQUILA MOORE.

Witnesses:
JOHN E. EARLE,
FRED C. EARLE.